United States Patent
Hirano et al.

[11] Patent Number: 5,864,452
[45] Date of Patent: Jan. 26, 1999

[54] THIN-FILM MAGNETIC HEAD AND METHOD OF FORMING CARBON FILM

[75] Inventors: Hitoshi Hirano, Nishinomiya; Keiichi Kuramoto; Yoichi Domoto, both of Hirakata; Seiichi Kiyama, Takatsuki, all of Japan

[73] Assignee: Sanyo Electric Co., Ltd., Osaka, Japan

[21] Appl. No.: 831,835

[22] Filed: Apr. 2, 1997

Related U.S. Application Data

[63] Continuation of Ser. No. 509,385, Jul. 31, 1995, abandoned.

[30] Foreign Application Priority Data

| Aug. 3, 1994 | [JP] | Japan | 6-182561 |
| Aug. 25, 1994 | [JP] | Japan | 6-201132 |
| Aug. 25, 1994 | [JP] | Japan | 6-201133 |

[51] Int. Cl.$^6$ ............ G11B 5/60; G11B 5/187; G11B 21/21
[52] U.S. Cl. ........................ 360/122; 360/103
[58] Field of Search ................. 360/103, 104, 360/122, 102

[56] References Cited

U.S. PATENT DOCUMENTS

| 5,159,508 | 10/1992 | Grill et al. | 360/103 |
| 5,175,658 | 12/1992 | Chang et al. | 360/103 |
| 5,198,934 | 3/1993 | Kubo et al. | 360/103 |
| 5,336,550 | 8/1994 | Ganapathi et al. | 360/103 |
| 5,424,888 | 6/1995 | Hendriks et al. | 360/103 |
| 5,490,027 | 2/1996 | Hamilton et al. | 360/104 |

FOREIGN PATENT DOCUMENTS

| 72389 | 2/1983 | European Pat. Off. | 360/103 |
| 3714787 | 11/1988 | Germany . | |
| 58-150122 | 9/1983 | Japan . | |
| 62-125522 | 6/1987 | Japan . | |
| 1258218 | 10/1989 | Japan . | |
| 1260627 | 10/1989 | Japan . | |
| 4182911 | 6/1992 | Japan | 360/104 |
| 4-276367 | 10/1992 | Japan . | |
| 6-18054 | 3/1994 | Japan . | |
| 6150599 | 5/1994 | Japan . | |

OTHER PUBLICATIONS

IBM Tech. Disclosure Bulletin, "Bumper for Gliding Heads", Burus et al, vol. 4, No. 4, Sep. 1961, p. 3.
IBM Tech. Disclosure Bulletin, "Sliders for Magnetic Heads . . . ", Kaus et al, vol. 25, No. 7A, Dec. 1982, p. 3173.
IBM Tech. Disclosure Bulletin, "Silicon Nitride Protection . . . ", D'Heurle et al, vol. 19, No. 1, Jun. 1976, p. 351.
Japanese Abstract, JP 5–282646, Oct. 29, 1993, Sony Corp.

Primary Examiner—David L. Ometz
Attorney, Agent, or Firm—W. F. Fasse; W. G. Fasse

[57] ABSTRACT

A thin-film magnetic head which is adapted to be relatively moved on a magnetic recording medium for writing and/or reading information to and/or from the magnetic recording medium includes a carbon film of not more than 200 Å in thickness covering a slider surface of the thin-film magnetic head adapted to face the magnetic recording medium, and an intermediate layer formed in the form of island between the carbon film and the slider surface of the thin-film magnetic head.

10 Claims, 15 Drawing Sheets

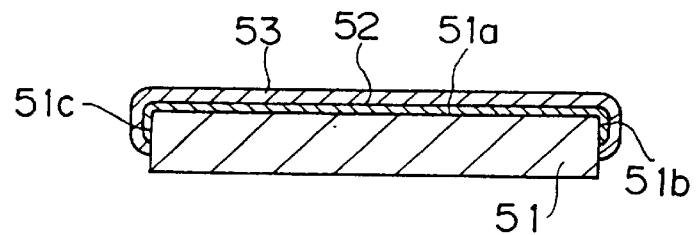
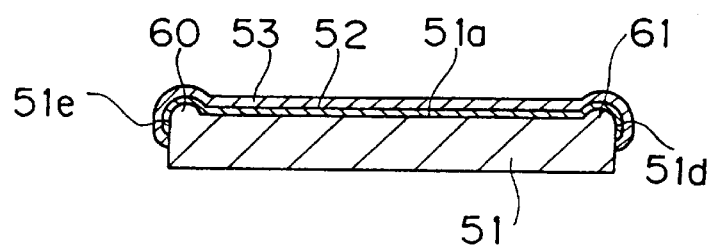
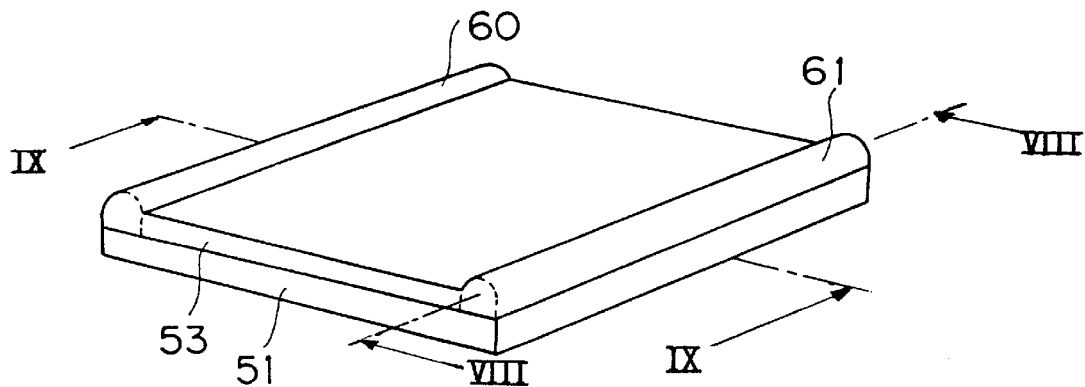

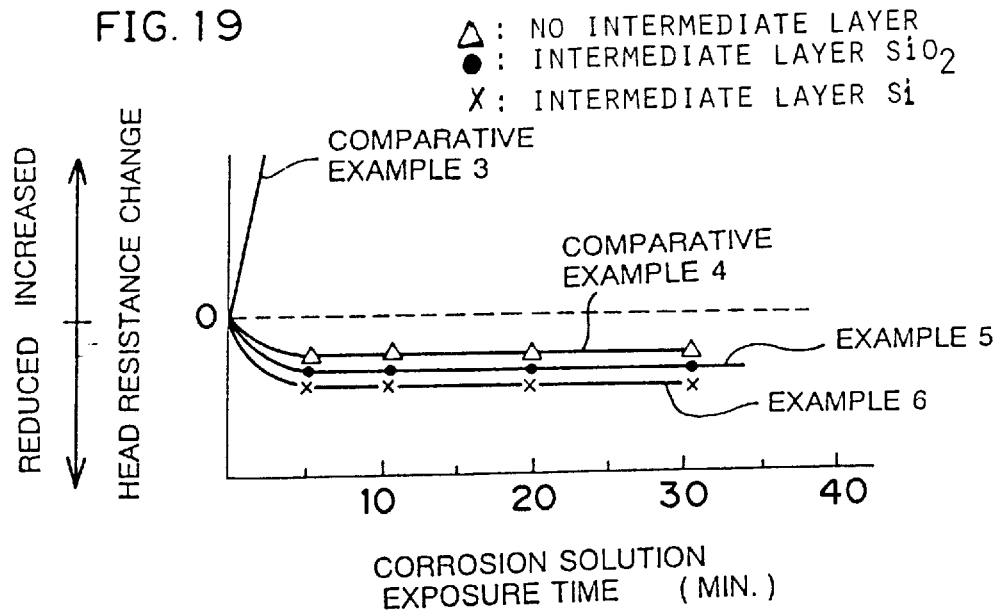
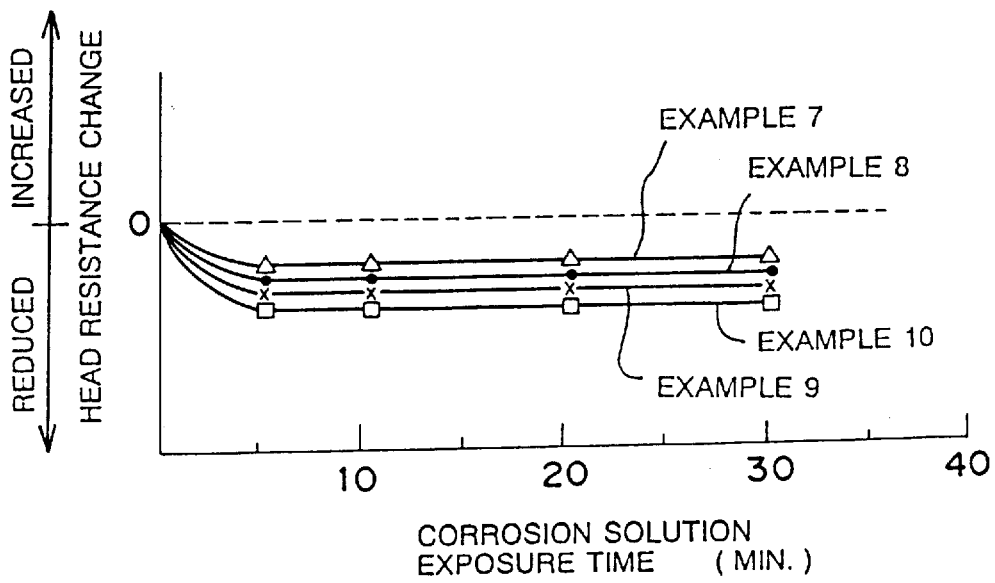

THIN-FILM MAGNETIC HEAD AND METHOD OF FORMING CARBON FILM

CROSS-REFERENCE TO RELATED APPLICATION

This application is a FILE-WRAPPER-CONTINUATION of U.S. application Ser. No.: 08/509,385; Filed On.: Jul. 31, 1995 now abandoned.

BACKGROUND OF THE INVENTION

1. Field of the Invention

The present invention relates to a thin-film magnetic head which is employed for reading or recording information in a magnetic disk unit or the like. The present invention also relates to a method of forming a carbon film on a substrate by electron cyclotron resonance (ECR) plasma CVD, and more particularly, it relates to a method of forming a carbon film on a substrate while applying a high-frequency voltage thereto.

2. Description of the Background Art

A thin-film magnetic head, which has an excellent frequency response and can make high-density recording by refining the track width and the bit length, is employed as a magnetic head for a magnetic disk unit or the like.

When a magnetic recording medium is started and rotated, the thin-film magnetic head is slightly upwardly separated from the medium so that a circulating air film is defined between a slider surface of the thin-film magnetic head and the magnetic recording medium. When the operation of the magnetic recording medium is stopped, the slider surface of the thin-film magnetic head comes into direct contact with the magnetic recording medium. Therefore, the slider surface of the thin-film magnetic head must have abrasion resistance. Further, a thin-film transducer portion which is formed by a magnetoresistive element or the like is easy to corrode, and hence it is necessary to protect this portion.

Japanese Patent Publication No. 6-18054 (1994) proposes a method of forming a film of molybdenum disulfide or the like on a surface of a thin-film magnetic head facing a magnetic recording medium, i.e., a slider surface. This gazette discloses a method of forming a film of molybdenum disulfide or carbon having a thickness of 200 to 800 Å on a slider surface of a thin-film magnetic head. It is possible to improve abrasion resistance and corrosion resistance by forming such a protective film.

However, the conventional thin-film magnetic head provided with such a protective film disadvantageously has a problem of extreme output reduction particularly in a high linear density region.

In magnetic recording employing a magnetic disk or the like, higher densification is required, and a thin-film magnetic head which can cope with such requirement is awaited.

On the other hand, a carbon film such as a diamond-like carbon film, which is employed as a protective film for a magnetic disk, a magnetic head or an optical part, is formed on a substrate by ECR plasma CVD, for example.

In such formation of a carbon film by ECR plasma CVD, a microwave is introduced into a plasma chamber while a gas containing carbon is introduced into a reaction chamber. In the plasma chamber, the frequencies of electrons rotated by a magnetic field and of the microwave coincide with each other to cause electron cyclotron resonance, thereby generating a plasma of high density. This plasma is introduced into the reaction chamber for decomposing the gas containing carbon in the plasma, thereby forming a carbon film on a substrate.

Such a carbon film having excellent abrasion resistance and corrosion resistance is formed as a protective film on a slider surface of a thin-film magnetic head which is relatively moved on a magnetic recording medium for reading and writing information from or to the medium (Japanese Patent Laying-Open No. 4-276367 (1992) etc.).

However, the plasma chamber is provided with an electromagnetic coil etc. applying a magnetic field, which exerts a damaging influence on the thin-film magnetic head and may break the head or deteriorate its performance.

On the other hand, the carbon film may be formed with application of a high-frequency voltage to the substrate so that the film is improved in adhesion. When the applied high-frequency voltage is increased in this case, however, the temperature of the substrate is disadvantageously increased to heat the thin-film magnetic head to a high temperature. Thus, the thin-film magnetic head is broken or its performance is deteriorated by heat.

SUMMARY OF THE INVENTION

An object of the present invention is to provide a thin-film magnetic head which can improve its output particularly in a high linear density region, thereby coping with high densification.

Another object of the present invention is to provide a method which can form a carbon film on a substrate such as a thin-film magnetic head, which may be broken or damaged by a magnetic field or a high temperature, by ECR plasma CVD without causing such breaking or damage.

Provided according to a first aspect of the present invention is a thin-film magnetic head which is adapted to be relatively moved on a magnetic recording medium for writing and/or reading information in and/or from the medium. A carbon film of not more than 200 Å in thickness is directly formed on a slider surface of the thin-film magnetic head facing the magnetic recording medium.

In one of preferred modes according to the first aspect of the present invention, the carbon film is formed not only on the slider surface of the thin-film magnetic head but on a side surface portion which is close to an edge of the slider surface. As hereinabove described, the thin-film magnetic head is slightly upwardly separated from the magnetic recording medium when the medium is started and rotated, while the former comes into contact with the latter when the operation of the medium is stopped. At this time, the thin-film magnetic head is slightly inclined with respect to the magnetic recording medium, whereby an edge of its slider surface comes into contact with the magnetic recording medium. According to this mode, the side surface portion which is close to the edge is covered with the carbon film, whereby the thin-film magnetic head can be effectively protected against severe contact in starting and stopping of the magnetic recording medium.

The carbon film which is formed in the first aspect of the present invention includes a crystalline diamond film and an amorphous diamond-like film, while an amorphous diamond-like film is preferable in consideration of slidability.

The carbon film preferably has a hydrogen content of at least 25 atomic %. When the hydrogen content is at least 25 atomic %, a carbon film having a small amount of a graphite component and high hardness can be obtained.

In general, a protective film such as a carbon film which is formed on a thin-film magnetic head is problematic in adhesion with respect to the thin-film magnetic head substrate. In order to improve such adhesion, therefore, an intermediate layer consisting of silicon etc. is generally interposed between the thin-film magnetic head substrate and the carbon film (refer to Japanese Patent Laying-Open No. 4-276367 (1992), for example).

The inventors have deeply studied the relation between the thickness of the carbon film and adhesion, and discovered that the carbon film attains excellent adhesion with respect to the thin-film magnetic head substrate when its thickness is not more than 200 Å. According to the first aspect of the present invention, a carbon film of not more than 200 Å in thickness is directly formed on the slider surface of the thin-film magnetic head, to attain excellent adhesion. When the thickness of the carbon film exceeds 200 Å, the film is extremely influenced by difference between the thermal expansion coefficients of the same and the substrate etc. Thus, stress is increased and adhesion is deteriorated.

In the thin-film magnetic head according to the first aspect of the present invention, the carbon film of not more than 200 Å in thickness is directly formed on the slider surface of the thin-film magnetic head. Due to such reduction of the thickness of the carbon film, it is possible to reduce stress which is caused by difference between the thermal expansion coefficients between the carbon film and the thin-film magnetic head etc., whereby the carbon film can be directly formed on the thin-film magnetic head with no separation. Thus, the thin-film magnetic head according to the first aspect of the present invention can be formed through simpler steps, with no requirement for formation of an intermediate layer.

The thickness of the protective film which is formed on the slider surface of the thin-film magnetic head is so small that a magnetic sensitive portion such as a thin-film transducer can be moved closer to the magnetic recording medium, whereby the output can be improved particularly in a high linear density region, to attain high densification in recording and/or reproduction.

Provided according to a second aspect of the present invention is a thin-film magnetic head which is adapted to be relatively moved on a magnetic recording medium for writing and/or reading information in and/or from the medium. A slider surface of the thin-film magnetic head facing the magnetic recording medium is covered with a carbon film of not more than 200 Å in thickness, while an intermediate layer is formed in at least a partial region between the carbon film and the slider surface of the thin-film magnetic head.

Provided according to a third aspect of the present invention is a thin-film magnetic head which is adaped to be relatively moved on a magnetic recording medium for writing and/or reading information in and/or from the medium. A slider surface of the thin-film magnetic head facing the magnetic recording medium and a side surface portion which is close to an edge of the slider surface are covered with a carbon film. The thickness of the carbon film is preferably not more than 200 Å, similarly to the second aspect.

According to each of the second and third aspects of the present invention, the thickness of the carbon film is preferably at least 10 Å. If the film thickness is smaller than 10 Å, the thin-film magnetic head may be insufficient in abrasion resistance and corrosion resistance.

In the third aspect of the present invention, an intermediate layer may be formed between the carbon film and the slider surface of the thin-film magnetic head. Such an intermediate layer is formed in at least a partial region between the carbon film and the slider surface of the thin-film magnetic head.

According to each of the second and third aspects of the present invention, the intermediate layer is formed in at least a partial region between the carbon film and the slider surface of the thin-film magnetic head. Thus, the intermediate layer is formed on the overall region or a partial region between the carbon film and the slider surface of the thin-film magnetic head. According to each of the second and third aspects of the present invention, therefore, the intermediate layer may be formed not as a continuous film, but may be dispersed in the form of islands, for example.

The intermediate layer which is provided in each of the second and third aspects of the present invention is adapted to improve adhesion between the carbon film and the slider surface of the thin-film magnetic head, and its thermal expansion coefficient preferably approximates to that of the carbon film. The thermal expansion coefficient of the carbon film is 1.0 to $6.1 \times 10^{-6}/°$ C., and hence that of the intermediate layer is preferably 1.0 to $10.0 \times 10^{-6}/°$ C.

In each of the second and third aspects of the present invention, the material for the intermediate layer can be selected from Si, Zr, Ti, Ru and Ge, and oxides, nitrides and carbides thereof.

Thermal expansion coefficients of typical examples of these materials are as follows:

Si: 2.6 to $7.3 \times 10^{-6}/°$ C.
Zr: 5.4 to $5.9 \times 10^{-6}/°$ C.
Ti: 8.4 to $8.6 \times 10^{-6}/°$ C.
Ru: $9.1 \times 10^{-6}/°$ C.
Ge: 5.7 to $6.0 \times 10^{-6}/°$ C.
$SiO_2$: 0.4 to $7.8 \times 10^{-6}/°$ C.

The thickness of the intermediate layer is preferably 5 to 150 Å, and more preferably 10 to 50 Å. Sufficient adhesion cannot be obtained if the thickness of the intermediate layer is too small, while no remarkable effect is attained in improvement of adhesion and output reduction may be caused if the thickness of the intermediate layer is too large.

According to each of the second and third aspects of the present invention, the intermediate layer may be non-homogeneous as a whole. For example, an intermediate layer which is made of a carbide may have a structure with a compositional gradient such that its carbon content is gradually increased from the slider surface of the thin-film magnetic head toward the carbon film.

The carbon film which is formed in the present invention includes a crystalline diamond film and an amorphous diamond-like film, while an amorphous diamond-like film is preferable in consideration of slidability.

In the thin-film magnetic head according to the second aspect of the present invention, its slider surface is covered with the carbon film of not more than 200 Å in thickness. Since the protective film consisting of the carbon film has an extremely small thickness of not more than 200 Å, a thin-film transducer portion can be positioned closer to the magnetic recording medium, thereby increasing the output particularly in a high linear density region. Further, high densification can be attained in recording and/or reproduction.

According to the second aspect of the present invention, the intermediate layer is formed in at least a partial region between the carbon film and the slider surface of the thin-film magnetic head. Due to the formation of such an intermediate layer, adhesion between the slider surface of the thin-film magnetic head and the carbon film can be improved.

According to the third aspect of the present invention, the slider surface of the thin-film magnetic head and the side surface portion which is close to the edge of the slider surface are covered with the carbon film. As hereinabove described, the thin-film magnetic head is slightly upwardly separated from the magnetic recording medium when the medium is started and rotated, while the former comes into contact with the latter when the operation is stopped. At this time, the thin-film magnetic head is slightly inclined with respect to the magnetic recording medium, whereby an edge of its slider surface comes into contact with the magnetic recording medium. According to the third aspect of the present invention, the side surface portion which is close to the edge is covered with the carbon film, whereby the thin-film magnetic head can be effectively protected against severe contact in starting and stopping of the magnetic recording medium, and abrasion resistance can be improved. When the thin-film magnetic head is employed in a state positioned closer to the magnetic recording medium for improving the output and attaining high densification, the edge of the slider surface easily comes into contact with the recording medium. In the thin-film magnetic head according to the third aspect of the present invention, the carbon film is formed also on the side surface portion which is close to the edge, whereby the magnetic head can be positioned closer to the recording medium for improving the output and attaining high densification.

In the thin-film magnetic head according to the second aspect of the present invention, the slider surface of the thin-film magnetic head is covered with the carbon film of not more than 200 Å in thickness. Therefore, the thin-film magnetic head has excellent abrasion resistance and its thin-film transducer portion can be positioned closer to the magnetic recording medium, for improving the output particularly in a high linear density region. Since the thin-film magnetic head can be positioned closer to the magnetic recording medium, it is possible to cope with high densification.

In the thin-film magnetic head according to the third aspect of the present invention, the slider surface of the thin-film magnetic head and the side surface portion which is close to the edge of the slider surface are covered with the carbon film. Therefore, it is possible to reduce damage of the head which is caused when the same comes into contact with a disk or the like upon stopping of its operation. Consequently, the thin-film magnetic head can be positioned closer to a magnetic recording medium such as a disk, whereby it is possible to improve the output and cope with high densification.

A method of forming a carbon film according to the present invention comprises the steps of generating a high-density plasma by ECR through a magnetic field from first magnetic field generation means, introducing a gas containing carbon into the plasma and decomposing the same, thereby forming a carbon film on a substrate to which a high-frequency voltage is applied, and providing second magnetic field generation means in the vicinity of the substrate for reducing the magnetic field from the first magnetic field generation means in the vicinity of a portion on the substrate while reducing the high-frequency voltage which is applied to the substrate with formation of the carbon film.

According to the present invention, the second magnetic field generation means is provided in the vicinity of the substrate independently of the first magnetic field generation means generating the magnetic field for ECR, for reducing the magnetic field generated by the first magnetic field generation means. Therefore, the magnetic field is so reduced in the vicinity of the substrate that an influence exerted on the substrate by the magnetic field can be reduced. Also when the substrate is formed by a thin-film magnetic head or the like which is easily influenced by magnetism, therefore, a carbon film can be formed on the substrate without causing breaking or reduction of performance thereof by the magnetic field.

According to the present invention, the magnetic field is preferably reduced to be substantially zeroed on the substrate. Thus, it is possible to minimize the influence which is exerted on the substrate by the magnetic field.

According to the present invention, the second magnetic field generation means is preferably provided inside a substrate holder holding the substrate. The first magnetic field generation means for ECR is generally provided above the substrate, and hence the second magnetic field generation means is preferably located inside the substrate holder, in order to face the first magnetic generation means and cancel the magnetic field which is generated therefrom.

According to the present invention, a self-bias voltage which is generated in the substrate is reduced with formation of the carbon film. Thus, it is possible to suppress the substrate temperature from being increased to a high level, thereby preventing the substrate such as a thin-film magnetic head from breaking or reduction of performance thereof.

The self-bias voltage which is generated in the substrate can be gradually reduced in a continuous or step-wise manner from starting up to completion of formation of the carbon film.

Further, the self-bias voltage which is generated in the substrate is preferably reduced to not more than 80% of the self-bias voltage upon starting of the formation of the carbon film, up to completion thereof. For example, a self-bias voltage of 100 V in an initial stage is reduced to be not more than 80 V in a final stage.

It has been recognized that it is important to increase the self-bias voltage which is generated in the substrate in an initial stage of formation of the carbon film for improving kinetic energy of ions reaching the substrate, in order to improve adhesion of the carbon film with respect to the substrate. On the basis of this recognition, the present invention is adapted to increase the self-bias voltage which is generated in the substrate in an initial stage of formation of the carbon film and thereafter to gradually reduce this self-bias voltage toward completion of the formation of the carbon film. When the self-bias voltage which is generated in the substrate in starting of the formation of the carbon film is thus increased, a good adhesion of the carbon film with respect to the substrate is achieved and is not much reduced even upon the following reduction of this self-bias voltage.

According to the present invention, it is possible to minimize an influence exerted by the magnetic field in formation of the carbon film, while minimizing an influence exerted by the substrate temperature which is increased by application of the high-frequency voltage.

Therefore, it is possible to form a carbon film on a substrate such as a thin film magnetic head, which may be broken by an influence exerted by a magnetic field or a high temperature, by ECR plasma CVD with no breaking caused by such a magnetic field or high temperature.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a sectional view taken along a line VIII—VIII in FIG. 10;

FIG. 9 is a sectional view taken along a line IX—IX in FIG. 10;

FIG. 10 is a perspective view showing a thin-film magnetic head according to an embodiment of the present invention;

FIG. 19 illustrates corrosion resistance of Examples according to the present invention and comparative examples;

FIG. 20 illustrates corrosion resistance of Examples according to the present invention and comparative examples;

DESCRIPTION OF THE PREFERRED EMBODIMENTS

Figure 1:
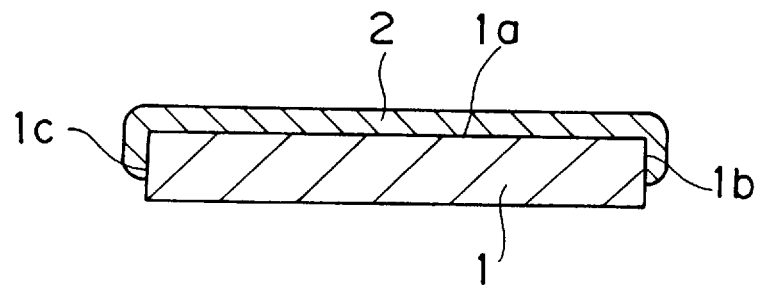
FIG. 1 is a sectional view taken along a line I—I in FIG. 3.
Figure 2:
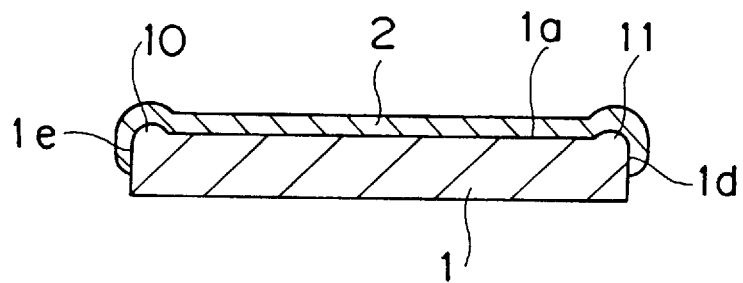
FIG. 2 is a sectional view taken along a line II—II in FIG. 3.
Figure 3:
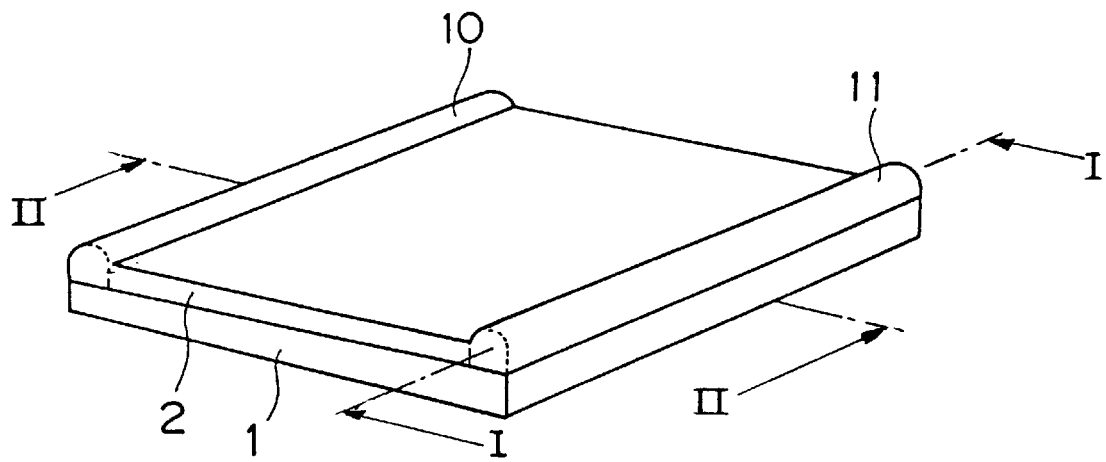
FIG. 3 is a perspective view showing a thin-film magnetic head of an embodiment according to the first aspect of the present invention.

FIGS. 1 to 3 show a thin-film magnetic head 1 according to the embodiment of the first aspect of the present invention. FIG. 3 is a perspective view, and FIGS. 1 and 2 are sectional views taken along the lines I—I and II—II in FIG. 3 respectively. Referring to FIGS. 1 and 2, a carbon film 2 is formed on a slider surface 1a of the thin-film magnetic head 1 adapted to face magnetic recording medium. Rail portions 10 and 11 are formed on both edges of the thin-film magnetic head 1 and especially have rounded profiles as shown in FIG. 2. The carbon film 2 is formed to cover not only the slider surface 1a but side surface portions 1b to 1e which are close to the edges of the slider surface 1a.

Figure 4:
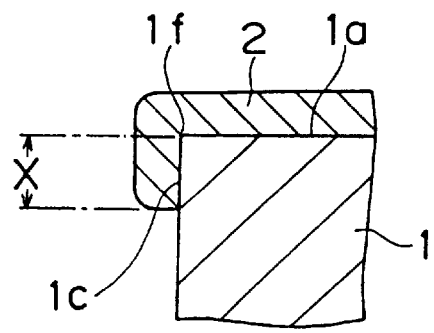
FIG. 4 is a partially enlarged sectional view showing a portion around an edge of a slider surface of a thin-film magnetic head according to a preferred mode of the first aspect of the present invention.

FIG. 4 is a partial sectional view showing a portion around an edge 1f of the slider surface 1a of the thin-film magnetic head 1. As shown in FIG. 4, the carbon film 2 is formed to cover the slider surface 1a and the side surface portion 1c which is close to the edge 1f of the slider surface 1a. A length X of the carbon film 2 in a portion covering the side surface portion 1c, which is properly selected in response to the shape, dimensions etc. of the thin-film magnetic head 1, is preferably in the range of about 5 to 150 μm, in general. The portion of the carbon film 2 covering the side surface portion 1c is generally formed in a thickness which is equal to or not more than that of the portion covering the slider surface 1a. In general, therefore, the thickness of this portion is preferably not more than 200 Å.

Figure 5:
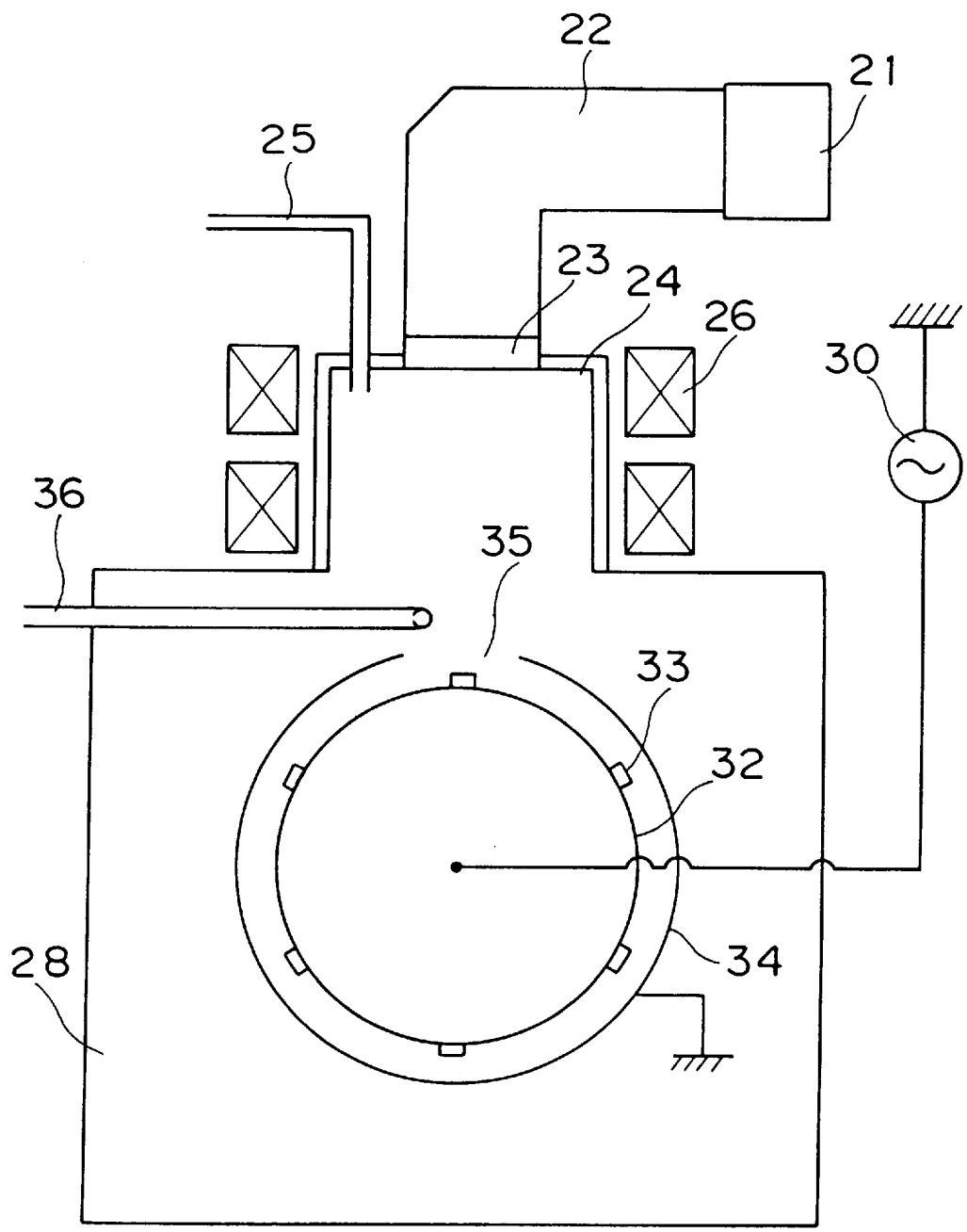
FIG. 5 is a schematic sectional view showing an exemplary apparatus for forming carbon films in Examples according to the first aspect of the present invention.

FIG. 5 is a schematic sectional view showing an apparatus for forming carbon films in Examples according to the first aspect of the present invention. Referring to FIG. 5, a plasma generation chamber 24 is provided in a vacuum chamber 28. An end of a waveguide 22 is mounted on the plasma generation chamber 24. Microwave supply means 21 is provided on another end of the waveguide 22. A microwave which is generated in the microwave supply means 21 is guided to the plasma generation chamber 24 through the waveguide 22 and a microwave introducing window 23. The plasma generation chamber 24 is provided therein with a discharge gas inlet pipe 25 for introducing a discharge gas such as argon (Ar) gas into the plasma generation chamber 24. A plasma magnetic field generator 26 is provided around the plasma generation chamber 24. A high-frequency magnetic field caused by the microwave and a magnetic field from the plasma magnetic field generator 26 are worked to form a high-density plasma in the plasma generation chamber 24.

A cylindrical substrate holder 32 is provided in the vacuum chamber 28. This substrate holder 32 is rotatable about a shaft (not shown) which is provided perpendicularly to wall surfaces of the vacuum chamber 28. A plurality of thin-film magnetic heads 33 are mounted on a peripheral surface of the substrate holder 32 at regular intervals. A high-frequency power source 30 is connected to the substrate holder 32.

A cylindrical shield cover 34 of a metal is provided around the substrate holder 32 at a prescribed distance. This shield cover 34 is connected to a ground electrode. The shield cover 34 is adapted to prevent discharging between portions of the substrate holder 32 other than those for forming films and the vacuum chamber 28 by an RF voltage which is applied to the substrate holder 32 in formation of films. The substrate holder 32 and the shield cover 34 are so arranged that the distance therebetween is not more than the mean free path of gas molecules. According to this embodiment, the substrate holder 32 and the shield cover 34 are arranged at a distance of about 5 mm, which is not more than 1/10 of the mean free path of the gas molecules.

The shield cover 34 is provided with an opening 35. The plasma which is drawn out from the plasma generation chamber 24 is applied to the thin-film magnetic heads 33 which are mounted on the substrate holder 32 through the opening 35. A reaction gas inlet pipe 36 is provided in the vacuum chamber 28, so that its forward end is located above the opening 35.

Figure 6:
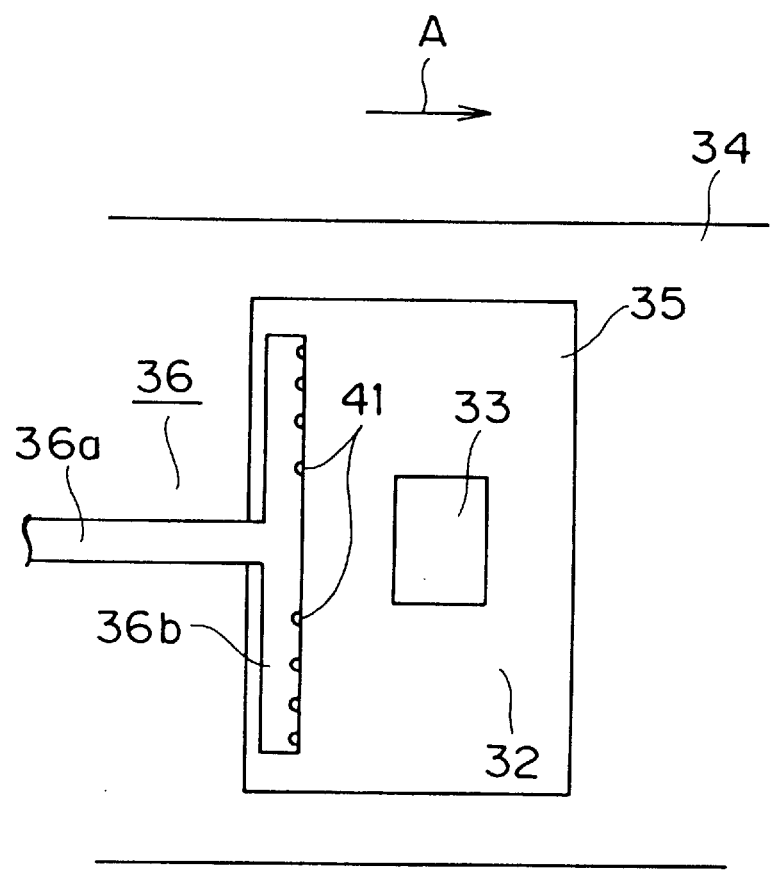
FIG. 6 is a plan view showing a portion of the apparatus shown in FIG. 5 around a first opening.

FIG. 6 is a plan view showing a portion around the forward end of the reaction gas inlet pipe 36. Referring to FIG. 6, the reaction gas inlet pipe 36 is formed by a gas inlet part 36a for introducing a raw material gas such as $CH_4$ gas into the vacuum chamber 28 from the exterior, and a gas outlet part 36b which is perpendicularly connected with the gas inlet part 36a. The gas outlet part 36b is arranged perpendicularly to a direction A of rotation of the substrate holder 32, and positioned above the opening 35 and upstream thereof in the direction of its rotation. This gas outlet part 36b is provided with a plurality of holes 41 in a direction downwardly inclined at about 45°. According to this embodiment, the gas outlet part 36b is provided with eight such holes 41.

The aforementioned ECR plasma generator is employed to apply a plasma which is drawn out from the plasma generation chamber 24 onto the thin-film magnetic heads 33 mounted on the substrate holder 28 while a raw material gas such as $CH_4$ gas is supplied from the reaction gas inlet pipe 36, thereby forming carbon films on the thin-film magnetic heads 33.

In order to study relations between thicknesses of carbon films and adhesion, carbon films of various thicknesses were formed on Altic ($Al_2O_3$-TiC) substrates, which are generally employed as substrates of thin-film magnetic heads, through the apparatus shown in FIG. 5. The thicknesses of the carbon films were 50, 100, 200, 250 and 300 Å.

The vacuum chamber 28 was first evacuated to $10^{-5}$ to $10^{-7}$ Torr and the substrate holder 32 was rotated at a speed of about 10 rpm, while Ar gas was supplied from the discharge gas inlet pipe 25 at $5.7 \times 10^{-4}$ Torr. A microwave of 2.45 GHz and 100 W was supplied from the microwave supply means 21 to form an Ar plasma in the plasma generation chamber 24, and this Ar plasma was applied onto surfaces of the Altic substrates through the opening 35. At the same time, an RF voltage of 13.56 MHz was applied to the substrate holder 32 so that self-bias voltages generated in the Altic substrates were −50 V, and $CH_4$ gas was supplied from the reaction gas inlet pipe 36 at $1.3 \times 10^{-3}$ Torr. In the aforementioned steps, times for depositing thin films were varied to obtain the aforementioned carbon films having different thicknesses.

50 samples were prepared for each of the carbon films having different thicknesses, for evaluating adhesion of the carbon films. The adhesion was evaluated by an indentation test with a constant load of 1 kg through a Vickers indenter. The numbers of carbon films, which were directly formed on the Altic substrates, suffering or resulting in separation thereof were counted to evaluate the adhesion. Table 1 shows the results.

TABLE 1

| | Carbon Film Thickness | | | | |
|---|---|---|---|---|---|
| | 50 Å | 100 Å | 200 Å | 250 Å | 300 Å |
| Number of Samples Suffering Separation | 0 | 0 | 0 | 25 | 40 |

As clearly understood from Table 1, separation of the carbon films was recognized when the same were in excess of 200 Å in thickness, although absolutely no separation was recognized when the thicknesses of the carbon films were not more than 200 Å.

On the other hand, carbon films were directly formed on Altic substrates similarly to the above, with thicknesses exceeding 400 Å. It was recognized that natural separation of the carbon films was already caused upon formation thereof.

Every carbon film exhibited a hydrogen content of 30 atomic %.

EXAMPLES 1 AND 2

In a similar manner to the above, carbon films of 120 Å and 200 Å in thickness were formed on thin-film magnetic heads as Examples 1 and 2 respectively. On the other hand, a carbon film of 380 Å in thickness was formed on a thin-film magnetic head as comparative example 1. In comparative example 1, an intermediate layer of Si having a thickness of 20 Å was prepared and formed on the head and then the carbon film was formed on this intermediate layer. The intermediate layer was formed by sputtering, and the thin-film magnetic head provided with this intermediate layer was mounted on the substrate holder 32, to form the carbon film in the apparatus shown in FIG. 5.

Figure 7:
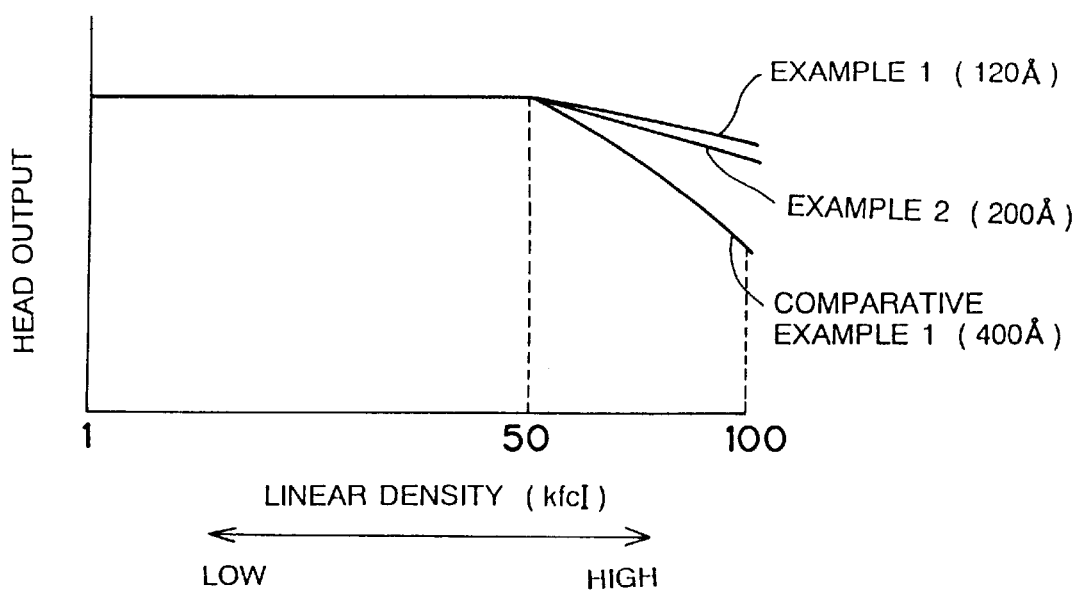
FIG. 7 illustrates head outputs of Examples according to the first aspect of the present invention and a comparative example.

As to the thin-film magnetic heads according to Examples 1 and 2 and comparative example 1 obtained in the aforementioned manner, relations between linear density values and head outputs were measured. FIG. 7 shows the results. As shown in FIG. 7, Examples 1 and 2 having the carbon films of not more than 200 Å in thickness exhibited high head outputs, particularly in the linear density range of at least 50 kfcI.

Then, the thin-film magnetic heads according to Examples 1 and 2 and comparative example 1 were subjected to an abrasion test, which was carried out by rubbing sample surfaces with alumina balls of φ10 mm to which a constant load of 100 gf was applied. Table 2 shows the results of the abrasion test.

For the purpose of comparison, Table 2 shows the abrasion loss of a base material provided with neither intermediate layer nor carbon film as 1.

TABLE 2

| | Example 1 | Example 2 | Comparative example 1 | With No Coating |
|---|---|---|---|---|
| Abrasion Loss | 0.59 | 0.61 | 0.60 | 1 |

It is clearly understood from Table 2 that Examples 1 and 2 in which the carbon films were directly formed on slider surfaces of the thin-film magnetic heads with thicknesses of not more than 200 Å were also abrasion-resistant similarly to comparative example 1.

Further, a corrosion test was made on the thin-film magnetic heads according to Examples 1 and 2 and comparative example 1. This corrosion test was made by employing aqueous iron chloride and dipping/exposing the thin-film magnetic heads in/to the same. After the thin-film magnetic heads were exposed to the corrosion solution for a prescribed time, head resistance values were measured. As the result, it was confirmed that the thin-film magnetic heads according to Examples 1 and 2 were also corrosion-resistant similarly to comparative example 1.

An embodiment according to the second and third aspect of the present invention is now described.

FIGS. 8 to 10 illustrate a thin-film magnetic head 51 according to an embodiment of the present invention. FIG. 10 is a perspective view, and FIGS. 8 and 9 are sectional views taken along the lines VIII—VIII and IX—IX in FIG. 10 respectively. Referring to FIGS. 8 and 9, an intermediate layer 52 is formed on a slider surface 51a of the thin-film magnetic head 51 facing a magnetic recording medium, and a carbon film 53 is formed on this intermediate layer 52. Rail portions 60 and 61 are formed on both edges of the thin-film magnetic head 51. This embodiment is according to both of the second and third aspects of the present invention. Therefore, the carbon film 53 is formed to cover not only the slider surface 51a but side surface portions 51b to 51e which are close to edges of the slider surface 51a.

Figure 11:
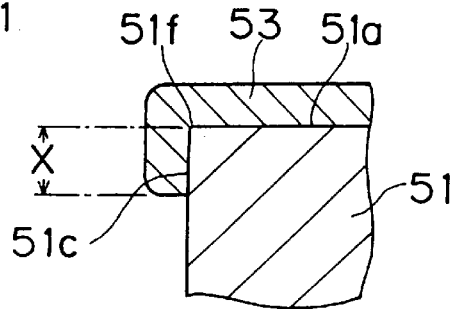
FIG. 11 is a sectional view showing an embodiment according to the third aspect of the present invention.

FIG. 11 is a partial sectional view for illustrating an embodiment according to the third aspect of the present invention. This figure shows a portion around an edge 51f of a slider surface 51a of a thin-film magnetic head 51. According to the third aspect of the present invention, a carbon film 53 is formed to cover the slider surface 51a and a side surface portion 51c which is close to the edge 51f of the slider surface 51a. A length X of the carbon film 53 in a portion covering the side portion 51c, which is properly selected in response to the shape, dimensions etc. of the thin-film magnetic head 51, is preferably in the range of about 5 to 150 μm, in general. The portion of the carbon film 53 covering the side surface portion 51c is generally formed in a thickness which is equal to or not more than that of the portion covering the slider surface 51a. In general, the thickness of this portion is preferably not more than 200 Å.

Figure 12:
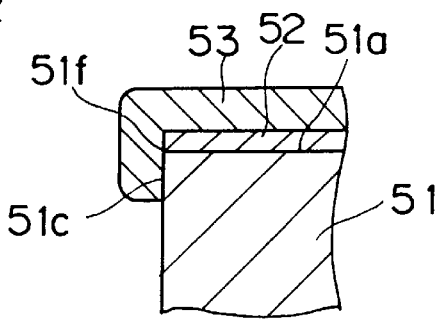
FIG. 12 is a sectional view showing another embodiment according to the second embodiment of the present invention.
Figure 13:
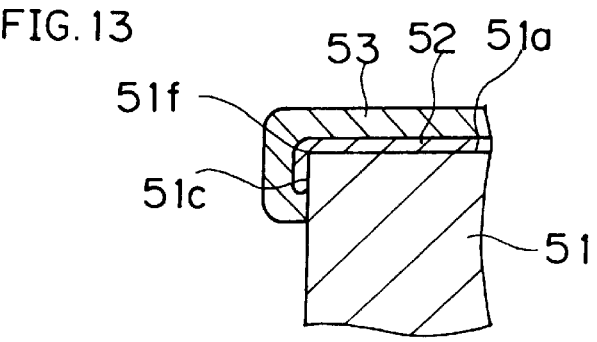
FIG. 13 is a sectional view showing still another embodiment according to the second embodiment of the present invention.

While the carbon film 53 is directly formed on the slider surface 51a of the thin-film magnetic head 51 in the embodiment shown in FIG. 11, an intermediate layer 52 may be formed between the carbon film 53 and the slider surface 51a, in accordance with the second aspect of the present invention. FIG. 12 shows a thin-film magnetic head 51 according to another embodiment, which is provided with an intermediate layer 52. In the embodiment Shown in FIG. 12, the intermediate layer 52 is not formed on a side surface portion 51c. FIG. 13 shows still another embodiment, in which an intermediate layer 52 is formed also on a side surface portion 51c.

Figure 14:
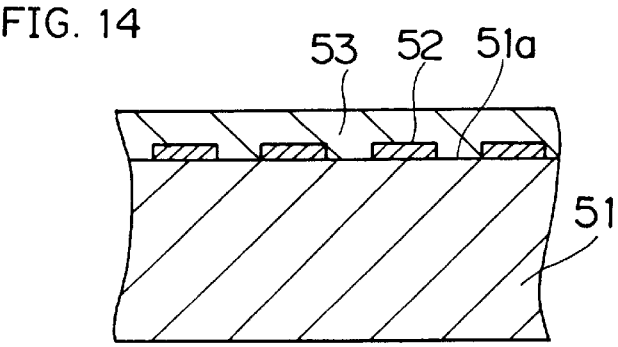
FIG. 14 is a sectional view showing an exemplary mode of an intermediate layer in the present invention.

The intermediate layer according to each of the second and third aspects of the present invention is formed in at least a partial region between the carbon film and the slider surface. Therefore, this layer is not necessarily be formed on the overall region. FIG. 14 illustrates an embodiment of intermediate layers 52 which are dispersed on a slider surface 51a in the form of islands. Such discontinuous films are generally formed when the intermediate layers 52 are reduced in thickness. The film thickness is preferably not more than 100 Å, and more preferably about 5 to 50 Å.

Figure 15:
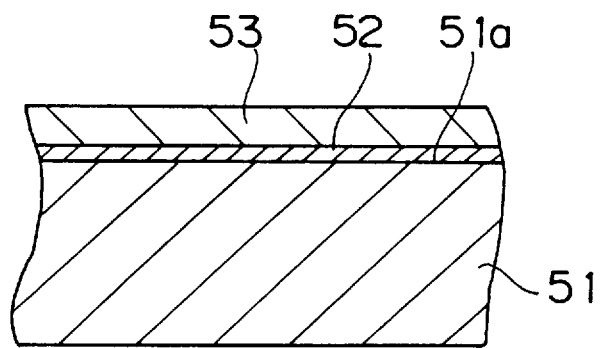
FIG. 15 is a sectional view showing another exemplary mode of an intermediate layer in the present invention.

FIG. 15 shows an embodiment of an intermediate layer 52 which is formed as a continuous film. In order to obtain such a continuous film, it is necessary to increase the thickness of the intermediate layer 52 in general. The film thickness is preferably about 100 to 150 Å in general.

Figure 16:
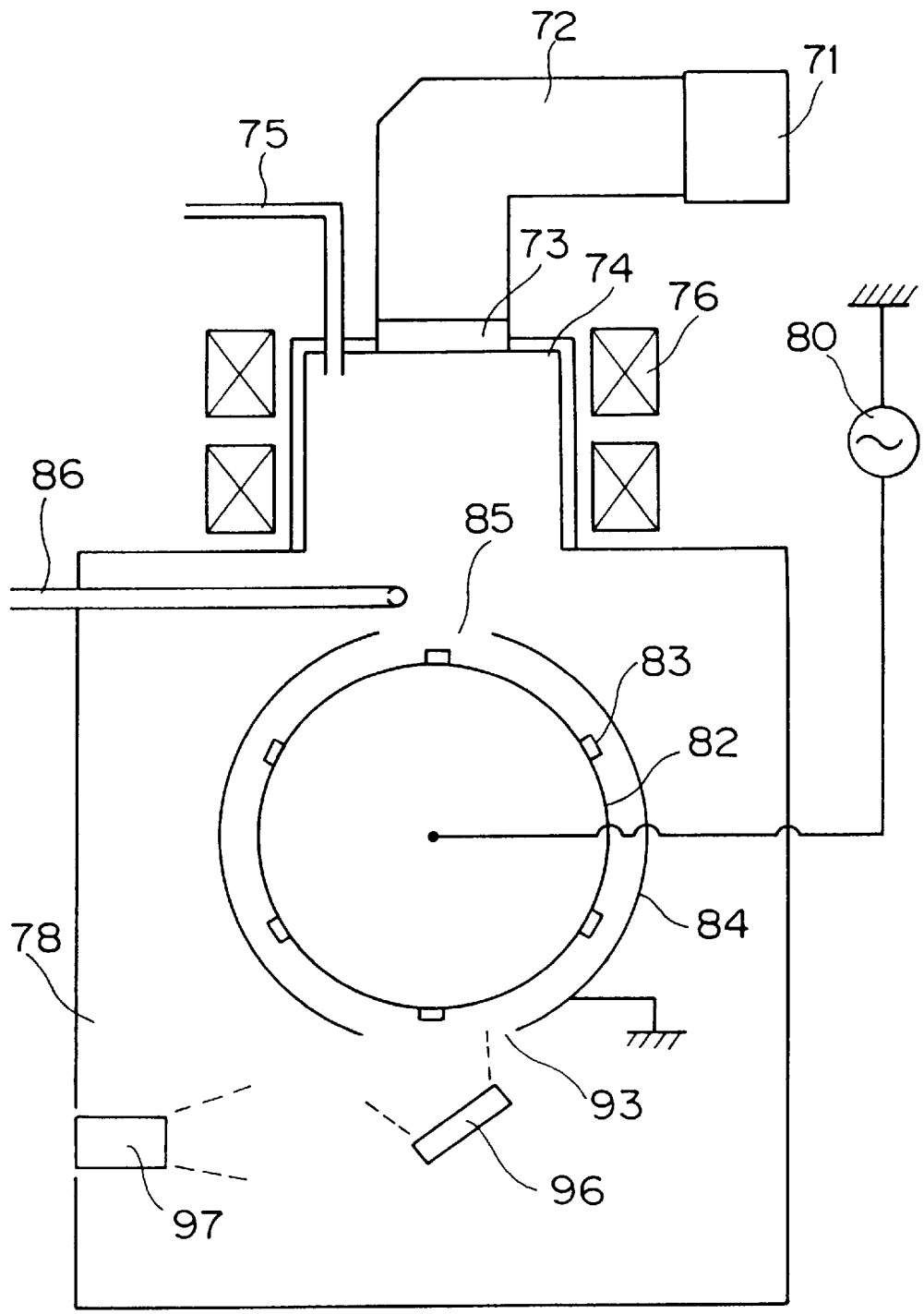
FIG. 16 is a schematic sectional view showing an exemplary apparatus for forming intermediate layers and carbon films in Examples according to the present invention.

FIG. 16 is a schematic sectional view showing an exemplary apparatus for forming intermediate layers and carbon films on thin-film magnetic heads in Examples according to the present invention. Referring to FIG. 16, a plasma generation chamber 74 is provided in a vacuum chamber 78. An end of a waveguide 72 is mounted on the plasma generation chamber 74. Microwave supply means 71 is provided on another end of the waveguide 72. A microwave which is generated in the microwave supply means 71 is guided into the plasma generation chamber 74 through the waveguide 72 and a microwave introducing window 73. The plasma generation chamber 74 is provided therein with a discharge gas inlet pipe 75 for introducing a discharge gas such as argon (Ar) gas into the plasma generation chamber 74. A plasma magnetic field generator 76 is provided around the plasma generation chamber 74. A high-frequency magnetic field caused by the microwave and a magnetic field from the plasma magnetic field generator 76 are worked to form a high-density plasma in the plasma generation chamber 74.

A cylindrical substrate holder 82 is provided in the vacuum chamber 78. This substrate holder 82 is rotatable about a shaft (not shown) which is provided perpendicularly to wall surfaces of the vacuum chamber 78. A plurality of thin-film magnetic heads 83 are mounted on a peripheral surface of the substrate holder 82 at regular intervals. A high-frequency power source 80 is connected to the substrate holder 82.

A cylindrical shield cover 84 of a metal is provided around the substrate holder 82 at a prescribed distance. This shield cover 84 is connected to a ground electrode. The shield cover 84 is adapted to prevent discharging between portions of the substrate holder 82 other than those for forming films and the vacuum chamber 78 by an RF voltage which is applied to the substrate holder 82 in formation of films. The substrate holder 82 and the shield cover 84 are so arranged that the distance therebetween is not more than the mean free path of gas molecules. According to this embodiment, the substrate holder 82 and the shield cover 84 are arranged at a distance of about 5 mm, which is not more than 1/10 of the mean free path of the gas molecules.

The shield cover 84 is provided with a first opening 85. The plasma which is drawn out from the plasma generation chamber 74 is applied to the thin-film magnetic heads 83 which are mounted on the substrate holder 82 through the first opening 85. A reaction gas inlet pipe 86 is provided in the vacuum chamber 78, so that its forward end is located above the first opening 85.

Figure 17:
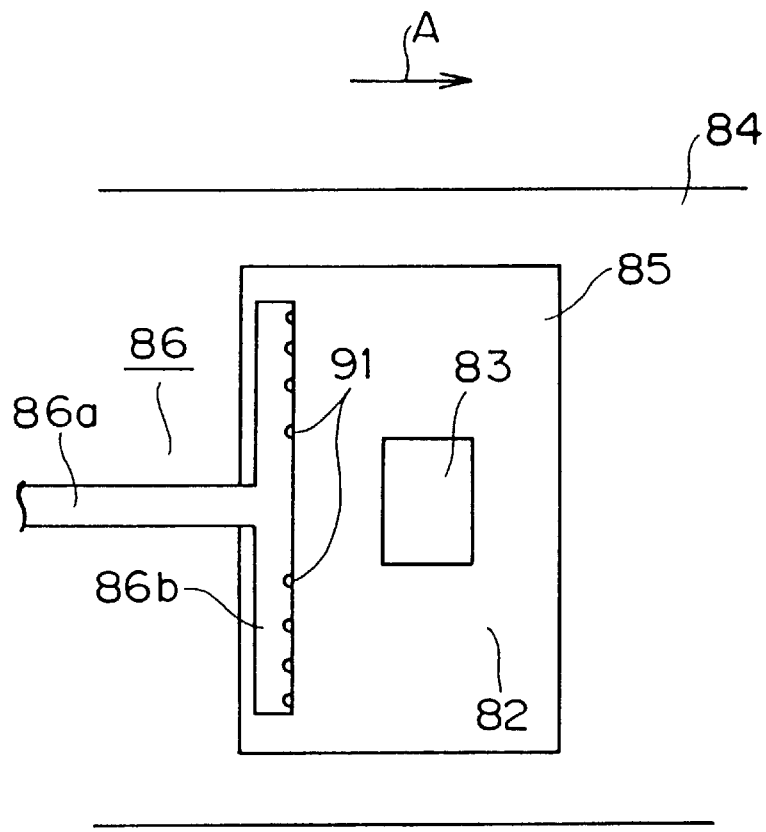
FIG. 17 is a plan view showing a portion of the apparatus shown in FIG. 16 around a first opening.

FIG. 17 is a plan view showing a portion around the forward end of the reaction gas inlet pipe 86. Referring to FIG. 17, the reaction gas inlet pipe 86 is formed by a gas inlet part 86a for introducing a raw material gas such as $CH_4$ gas into the vacuum chamber 78 from the exterior, and a gas outlet part 86b which is perpendicularly connected with the gas inlet part 86a. The gas outlet part 86b is arranged perpendicularly to a direction A of rotation of the substrate holder 82, and positioned above the first opening 85 and upstream thereof in the direction of its rotation. This gas outlet part 86b is provided with a plurality of holes 91 in a direction downwardly inclined at about 45°. According to this embodiment, the gas outlet part 86b is provided with eight such holes 91.

Referring again to FIG. 16, a second opening 93 is provided on a side which is opposite to the first opening 85. A target 96 consisting of material atoms for forming intermediate layers is provided under the second opening 93. An ion gun 97 is provided in the vicinity of the target 96, in order to apply ions of an inert gas toward the target 96 for sputtering the same. According to this embodiment, the inert gas is prepared from Ar gas. It is possible to apply the material atoms for forming intermediate layers onto the thin-film magnetic heads 83 by the target 96 and the ion gun 97.

EXAMPLES 3 AND 4

The apparatus shown in FIG. 16 was employed to form $SiO_2$ layers serving as intermediate layers and carbon films on thin-film magnetic heads.

First, the vacuum chamber 78 was evacuated to $10^{-5}$ to $10^{-7}$ Torr, and the substrate holder 82 was rotated at a speed of about 1 rpm. Then, oxygen was introduced into the vacuum chamber 78, and Ar gas was supplied to the ion gun 97 to emit Ar ions, which in turn were applied to the surface of the target 96 consisting of Si. At this time, the acceleration voltage for the Ar ions and the ion current density were set at 900 eV and 0.4 $mA/cm^2$ respectively. The oxygen partial pressure was set at $1 \times 10^{-4}$ Torr.

The aforementioned steps were carried out for about 1 minute, for forming intermediate layers of 20 Å in thickness, consisting of $SiO_2$, on the thin-film magnetic heads 83.

Then, supply of oxygen gas to the vacuum chamber 78 and the application of the Ar ions from the ion gun 97 were stopped and Ar gas was supplied from the discharge gas inlet pipe 75 of the plasma generation chamber 74 at $5.7 \times 10^{\times 4}$ Torr while a microwave of 2.45 GHz and 100 W was supplied from the microwave supply means 71 to form an Ar plasma in the plasma generation chamber 74, so that the Ar plasma was applied to the surfaces of the thin-film magnetic heads 83 and particularly the intermediate layers formed thereon, through the first opening 85. At the same time, an RF voltage of 13.56 MHz was applied from the high-frequency power source to the substrate holder 82 so that self-bias voltages generated in the thin-film magnetic heads 83 were −50 V, and $CH_4$ gas was supplied from the reaction gas inlet pipe 86 at $1.3 \times 10^{-3}$ Torr.

The aforementioned steps were carried out for about 1.7 minutes, about 3.1 minutes and about 6.5 minutes, to form carbon films of 100 Å, 180 Å and 380 Å on the intermediate layers as Examples 3 and 4 and comparative example 2 respectively.

Figure 18:
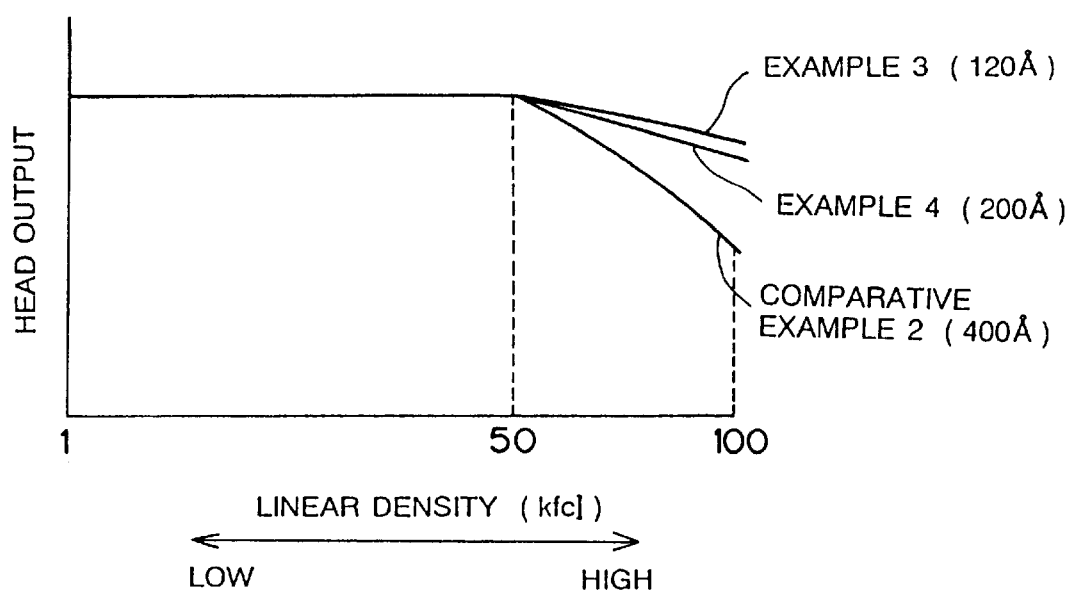
FIG. 18 illustrates head outputs of Examples according to the present invention and a comparative example.

As to the thin-film magnetic heads according to Examples 3 and 4 and the comparative example obtained in the aforementioned manner, relations between frequencies and head outputs were measured. FIG. 18 shows the results. As shown in FIG. 18, the thin-film magnetic heads according to Examples 3 and 4 each having the total thickness of the intermediate layer and the carbon film of not more than 200 Å exhibited high head outputs, particularly in the linear density range of at least 50 kfcI.

Table 3 shows the results of an abrasion test which was made on samples of thin-film magnetic heads provided with intermediate layers and carbon films under the same conditions as those for Examples 3 and 4. The test was carried out by rubbing surfaces of the samples with alumina balls of φ10 mm to which a constant load of 100 gf was applied. For the purpose of comparison, Table 3 shows the abrasion loss of a base material provided with neither intermediate layer nor carbon film as 1.

TABLE 3

|  | With No Coating | Example 3 | Example 4 |
| --- | --- | --- | --- |
| Abrasion Loss | 1 | 0.62 | 0.60 |

It is understood from Table 3 that Examples 3 and 4 were improved in abrasion resistance.

EXAMPLES 5 AND 6

Intermediate layers and carbon films were formed on thin-film magnetic heads, similarly to Example 3. Example 5 was prepared from an intermediate layer of $SiO_2$ having a thickness of 20 Å, and a carbon film of 100 Å in thickness. Example 6 was prepared from an intermediate layer of Si having a thickness of 9 Å. This intermediate layer of Si was formed by preparing the target 96 from Si and introducing no oxygen into the vacuum chamber 78. A carbon film formed on this intermediate layer was 111 Å in thickness.

Comparative example 3 was prepared by forming neither intermediate layer nor carbon film on a slider surface of a thin-film magnetic head. Comparative example 4 was prepared by directly forming a carbon film of 120 Å in thickness on a thin-film magnetic head, with no formation of an intermediate layer.

A corrosion test was carried out on the thin-film magnetic films according to Examples 5 and 6 and comparative examples 2 and 3 obtained in the aforementioned manner. The thin-film magnetic heads were exposed to a corrosion solution for prescribed times, and then the head resistance values and relations between the same and the exposure times was measured. FIG. 19 shows the results.

The corrosion test was carried out by employing properly diluted aqueous iron chloride and dipping the samples therein.

As clearly understood from FIG. 19, the head resistance was abruptly increased in comparative example 3 which was provided with no carbon film. Examples 5 and 6, which were provided with the carbon films which were formed after formation of the intermediate layers according to the present invention, exhibited superior corrosion resistance as compared with comparative example 4 which was provided with no intermediate layer.

EXAMPLES 7 TO 10

Then, targets 96 were prepared from Zr, Ti, Ru and Ge, for forming intermediate layers of $ZrO_2$, $TiO_2$, $RuO_2$ and $GeO_2$ to be 20 Å in thickness as Examples 7, 8, 9 and 10 respectively, and carbon films of 100 Å in thickness were formed on these intermediate layers, thereby preparing thin-film magnetic heads.

A corrosion test was made on the thin-film magnetic heads obtained in the aforementioned manner, similarly to Examples 5 and 6. FIG. 20 shows the results.

As clearly understood from FIG. 20, excellent corrosion resistance was attained also when the intermediate layers were prepared from the above materials. It was confirmed that high head outputs were obtained at a linear density of 50 kfcI, similarly to Example 3.

EXAMPLE 11

Example of forming a carbide of Si as an intermediate layer is now described.

Such an intermediate layer can be formed through the apparatus shown in FIG. 16 by rotating the holder 82 for depositing carbon at the first opening 85 while depositing Si at the second opening 93, thereby mixing Si and carbon with each other.

The vacuum chamber 78 was evacuated to $10^{-5}$ to $10^{-7}$ Torr, and the substrate holder 82 was rotated at a speed of about 10 rpm.

Then, Ar gas was supplied from the discharge gas inlet pipe 75 of the ECR generator at $5.7\times10^{-4}$ Torr, and a microwave of 2.45 GHz and 100 W was supplied from the microwave supply means 71, so that an Ar plasma formed in the plasma generation chamber 74 was applied to the surface of a thin-film magnetic head through the first opening 85. At the same time, an RF voltage of 13.56 MHz was applied from the high-frequency power source 80 to the substrate holder 82 so that a self-bias voltage generated in the thin-film magnetic head was −50 V, and $CH_4$ gas was supplied from the reaction gas inlet pipe 86 at 100 sccm, i.e., $1.3\times10^{-3}$ Torr.

Simultaneously with the aforementioned formation of the thin film by the ECR plasma generator, Ar ions were applied from the ion gun 97 to the surface of the target 96 which was prepared from Si. At this time, the acceleration voltage for the Ar ions and the ion current density were set at 900 eV and 0.4 mA respectively.

The aforementioned steps were carried out for about 1 minute, thereby forming a mixed layer of Si and C having a thickness of 20 Å.

A carbon film of 100 Å in thickness was formed on the intermediate layer consisting of Si and C.

The obtained thin-film magnetic head exhibited a high head output and excellent corrosion resistance, similarly to the aforementioned Examples.

EXAMPLE 12

Figure 21:
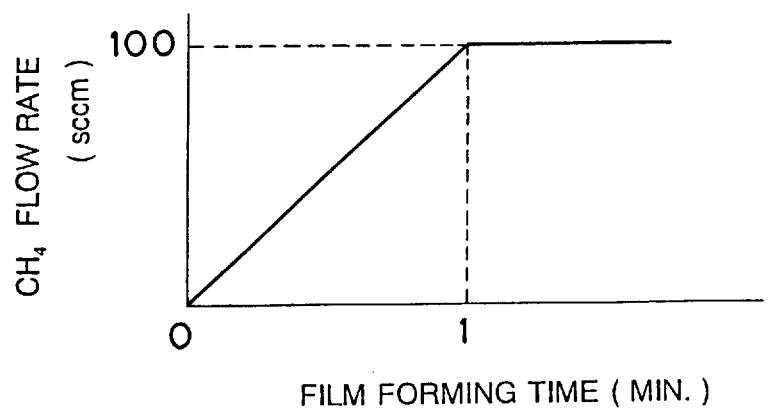
FIG. 21 illustrates the change over time of a $CH_4$ flow rate in an Example according to the present invention.
Figure 22:
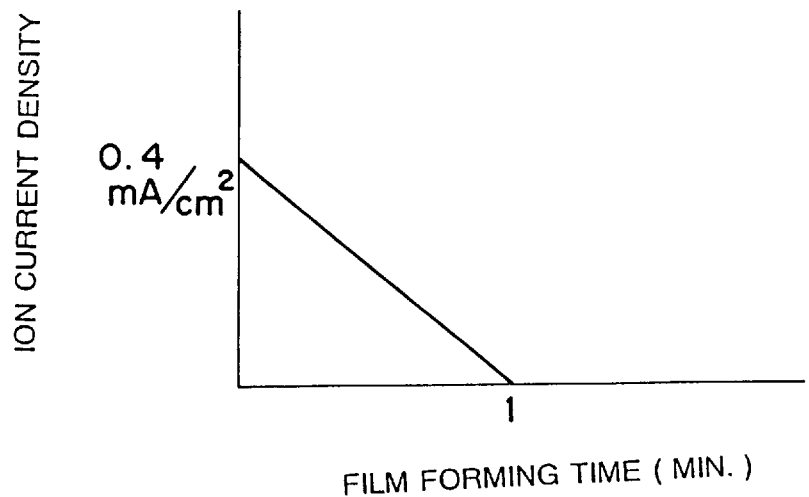
FIG. 22 illustrates the change over time of an ion current density in an Example according to the present invention.

The $CH_4$ gas supply quantity in Example 11 was successively increased with time as shown in FIG. 21, to be 100 sccm, i.e., $1.3\times10^{-3}$ Torr after a lapse of one minute. The ion current density of the Ar ions was successively reduced with time as shown in FIG. 22, to be 0 $mA/m^2$ after a lapse of one minute.

As described above, the carbon and Si deposition rates were gradually increased and reduced with time respectively, thereby forming an intermediate layer consisting of Si and C having a graded compositional structure which the carbon content was gradually increased from a substrate surface of a thin-film magnetic head. A carbon film of 100 Å in thickness was formed on this intermediate layer.

As to the thin-film magnetic head obtained in the aforementioned manner, a head output and corrosion resistance were tested similarly to the aforementioned Examples. As the result, the thin-film magnetic head according to this Example exhibited improvement of the output in a high linear density region, and was excellent in corrosion resistance.

EXAMPLE 13

An $SiO_2$ film of 20 Å in thickness was formed as an intermediate layer, and a carbon film of 100 Å in thickness was formed thereon similarly to Example 3. When the apparatus shown in FIG. 16 is employed, the carbon film can cover not only the slider surface but the edge portions on the side surface portions, as shown in FIGS. 8 to 10. In the case of Example 13, the value X shown in FIG. 11 was 100 μm. Further, the thickness of the carbon film was 50 Å on the side surface portions.

For the purpose of comparison, a thin-film magnetic head having an intermediate layer and a carbon film having thicknesses similar to the above was prepared by sputtering. This thin-film magnetic head was hardly provided with the intermediate layer and the carbon film on side surface portions. The expected useful lives of the thin-film magnetic heads according to Example 13 and this comparative example were calculated by measuring abrasion loss values etc. The thin-film magnetic head according to Example 13 exhibited a life of about 1.2 times that of the thin-film magnetic head according to the comparative example.

An embodiment of a method of forming a carbon film according to the present invention is now described.

Figure 23:
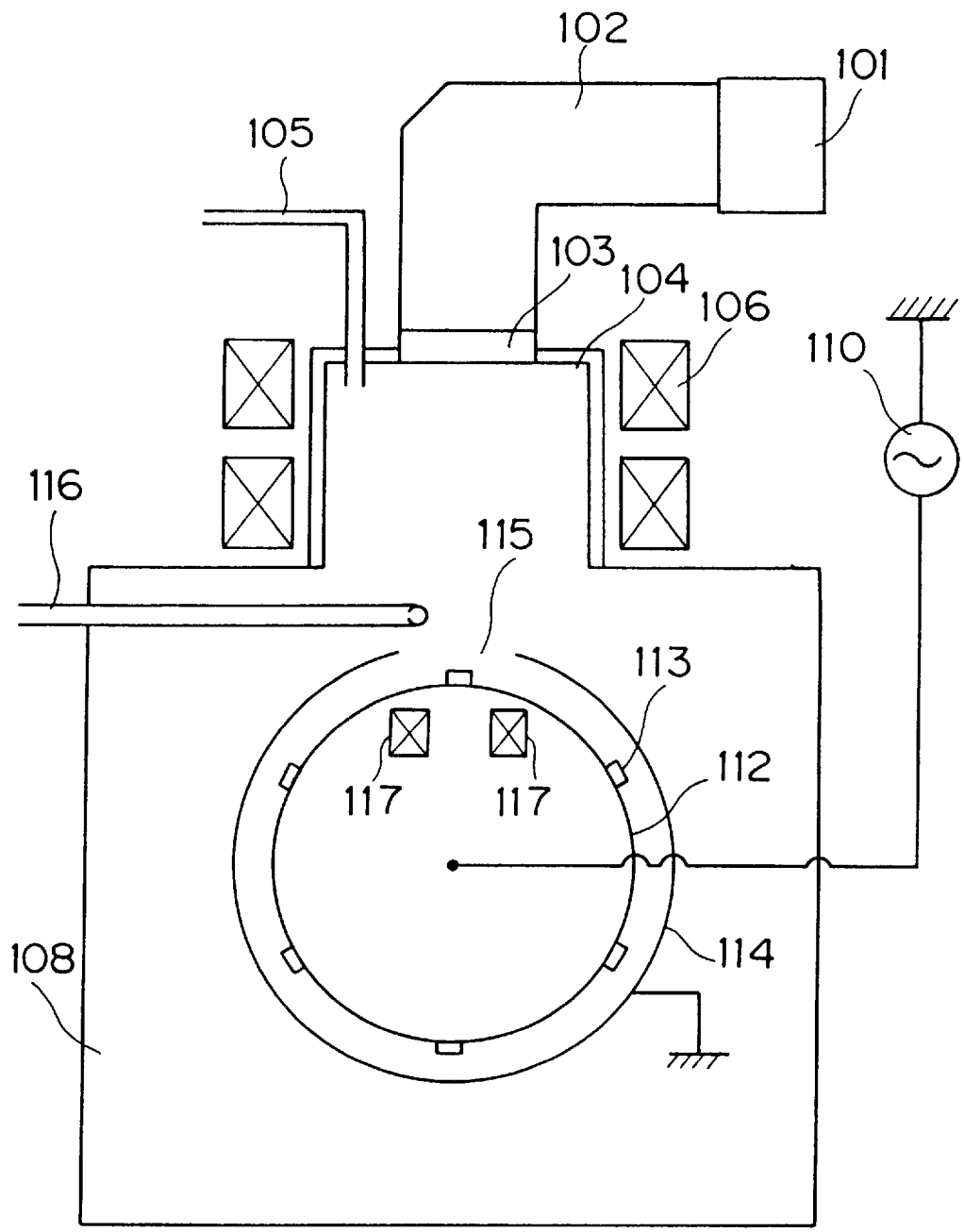
FIG. 23 is a schematic sectional view showing an exemplary ECR plasma CVD apparatus employed in an Example of a method according to the present invention.

FIG. 23 is a schematic sectional view showing an exemplary apparatus for carrying out the inventive method of forming a carbon film. Referring to FIG. 23, a plasma generation chamber 104 is provided in a vacuum chamber 108. An end of a waveguide 102 is mounted on the plasma generation chamber 104. Microwave supply means 101 is provided on another end of the waveguide 102. A microwave which is generated in the microwave supply means 101 is guided to the plasma generation chamber 104 through the waveguide 102 and a microwave introducing window 103. The plasma generation chamber 104 is provided therein with a discharge gas inlet pipe 105 for introducing a discharge gas such as argon (Ar) gas into the plasma generation chamber 104. A plasma magnetic field generator 106 consisting of an electromagnetic coil etc. is provided around the plasma generation chamber 104 for serving as first magnetic field generation means. A high-frequency magnetic field caused by the microwave and a magnetic field from the plasma magnetic field generator 106 are worked to form a high-density plasma in the plasma generation chamber 104.

A cylindrical substrate holder 112 is provided in the vacuum chamber 108. This substrate holder 112 is rotatable about a shaft (not shown) which is provided perpendicularly to wall surfaces of the vacuum chamber 108. A plurality of thin-film magnetic heads 113 are mounted on a peripheral surface of the substrate holder 112 at regular intervals. A high-frequency power source 110 is connected to the substrate holder 112.

A cylindrical shield cover 114 of a metal is provided around the substrate holder 112 at a prescribed distance. This shield cover 114 is connected to a ground electrode. The shield cover 114 is adapted to prevent discharging between portions of the substrate holder 112 other than those for forming films and the vacuum chamber 108 by an RF voltage which is applied to the substrate holder 112 in formation of films. The substrate holder 112 and the shield cover 114 are so arranged that the distance therebetween is not more than the mean free path of gas molecules. According to this embodiment, the distance is about 5 mm, which is not more than 1/10 of the mean free path of the gas molecules.

The shield cover 114 is provided with an opening 115. The plasma which is drawn out from the plasma generation chamber 104 is applied to the thin-film magnetic heads 113 which are mounted on the substrate holder 82 through the opening 115. A reaction gas inlet pipe 116 is provided in the vacuum chamber 108, so that its forward end is located above the opening 115.

Figure 24:
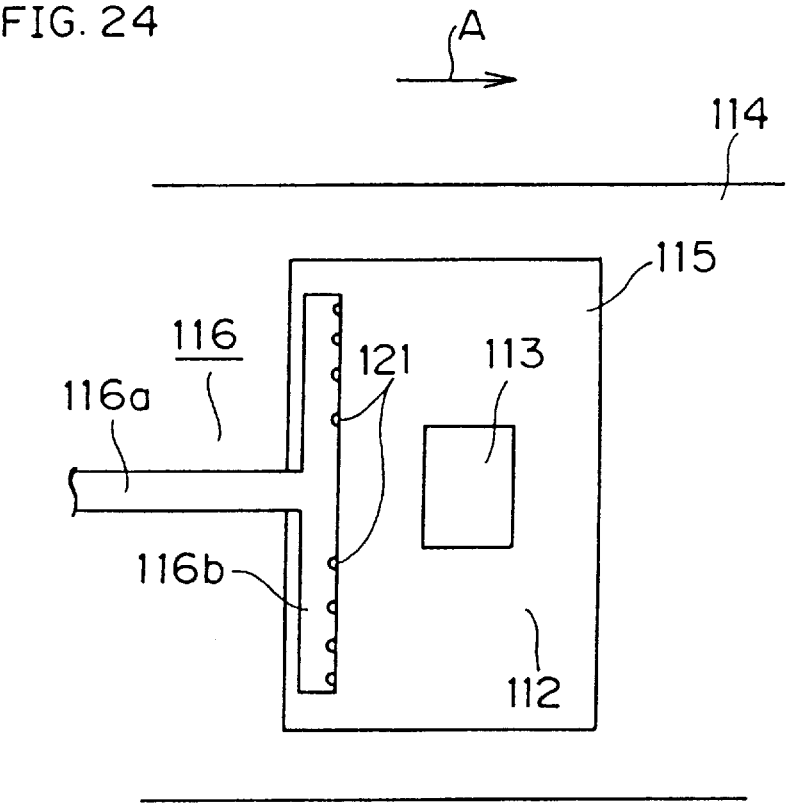
FIG. 24 is a plan view showing a portion of the apparatus shown in FIG. 23 around a first opening.

FIG. 24 is a plan view showing a portion around the forward end of the reaction gas inlet pipe 116. Referring to FIG. 24, the reaction gas inlet pipe 116 is formed by a gas inlet part 116a for introducing a raw material gas such as $CH_4$ gas into the vacuum chamber 108 from the exterior, and a gas outlet part 116b which is perpendicularly connected with the gas inlet part 116a. The gas outlet part 116b is arranged perpendicularly to a direction A of rotation of the substrate holder 112, and positioned above the first opening 115 and upstream thereof in the direction of its rotation. This gas outlet part 116b is provided with a plurality of holes 121 in a direction downwardly inclined at about 45°. According to this embodiment, the gas outlet part 116b is provided with eight such holes 121.

Referring again to FIG. 23, a magnetic field generator 117 consisting of an electromagnetic coil etc. is provided inside the substrate holder 112 under the opening 115 for serving as second magnetic generation means. This magnetic field generator 117 is adapted to generate a magnetic field upwardly from the substrate holder 112, for canceling a magnetic field which is downwardly generated from above the plasma generation chamber 104 by the plasma magnetic field generator 106 so that this magnetic field is zeroed in the vicinity of the substrates 113.

EXAMPLE 14

The aforementioned apparatus was employed to form a carbon film on a slider surface of a thin-film magnetic head serving as a substrate 113. Ar gas was supplied from the discharge gas inlet pipe 105 of the ECR plasma generator at $5.7 \times 10^{-4}$ Torr while a microwave of 2.45 GHz and 100 W was supplied from the microwave supply means 111, to generate an Ar plasma in the plasma generation chamber 104. A magnetic field was downwardly generated from above the plasma generation chamber 104 by the plasma magnetic field generator 106 to generate a high-density plasma by this magnetic field, for applying this plasma to the surface of the substrate 113.

A magnetic field was generated by the magnetic field generator 117 which was provided in the substrate holder 112 upwardly from under the substrate holder 112 for canceling the magnetic field from the plasma magnetic field generator 106, so that the magnetic field was substantially zeroed in the vicinity of the substrate 113.

Figure 25:
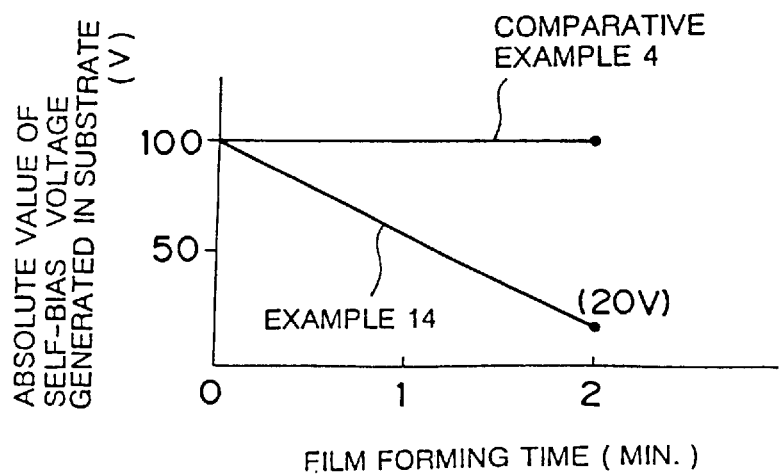
FIG. 25 illustrates changes over time of absolute values of self-bias voltages generated on substrates in an Example of the inventive method and a comparative example.

At the same time, an RF voltage of 13.56 MHz was applied from the high-frequency power source 110 to the substrate holder 112 so that a self-bias voltage generated in the substrate 113 was −100 V. At this time, the self-bias voltage which was generated in the substrate 113 was gradually reduced with the film forming time as shown in FIG. 25, to be −20 V upon a lapse of 2 minutes after film formation.

$CH_4$ gas was supplied from the reaction gas inlet pipe 116 into the vacuum chamber 108 at $1.3 \times 10^{-3}$ Torr.

A diamond-like carbon film of 120 Å in thickness was formed on the slider surface of the thin-film head serving as the substrate 113.

COMPARATIVE EXAMPLE 4

A diamond-like carbon film of 120 Å in thickness was formed on a slider surface of a thin-film magnetic head under similar conditions to Example 14, except that no magnetic field generator 117 shown in FIG. 23 serving as second magnetic field generation means was provided and a self-bias voltage generated in the substrate was generated and maintain at a constant value of −100 V continuously from formation of the carbon film to completion of such formation.

Figure 26:
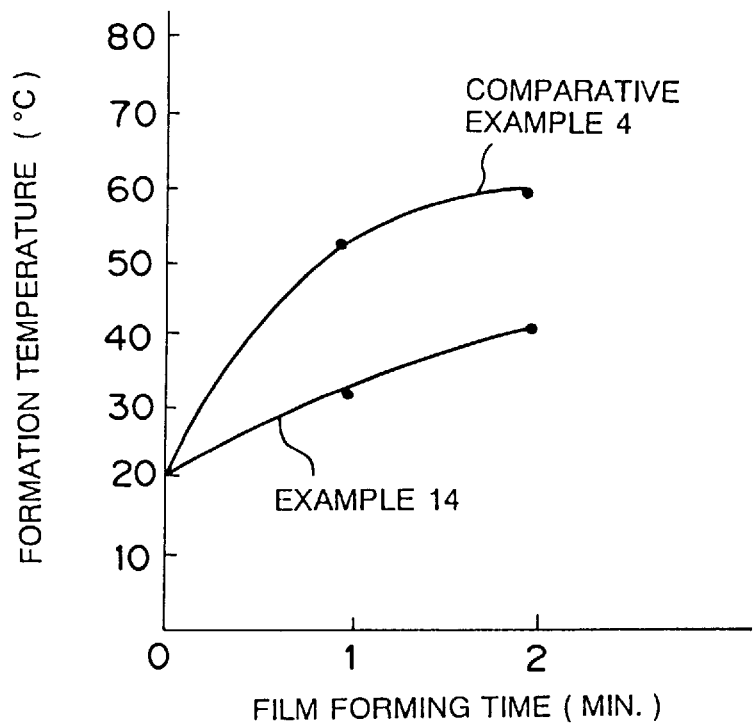
FIG. 26 illustrates changes of formation temperatures in an Example of the inventive method and a comparative example.

FIG. 26 shows formation temperatures in the steps of forming the carbon films according to Example 14 and comparative example 4, i.e., changes of substrate temperatures of the thin-film magnetic heads. While the formation temperature was about 40° C. in Example 14 upon a lapse of 2 minutes after completion of formation of the carbon film, that in comparative example 4 was 60° C.

Then, the carbon films of the thin-film magnetic heads according to Example 14 and comparative example 4 were subjected to an abrasion test, which was carried out by rubbing surfaces of samples provided with the carbon films with alumina balls of ϕ10 mm to which a constant load of 100 gf was applied. Table 4 shows the results. For the purpose of comparison, Table 4 shows the abrasion loss of a thin-film magnetic head base material provided with neither intermediate layer nor carbon film as a value of 1.

TABLE 4

|  | Example 14 | Comparative Example 4 | With No Coating |
|---|---|---|---|
| Abrasion Loss | 0.59 | 0.58 | 1 |

It is clearly understood from Table 4 that the thin-film magnetic heads according to Example 14 and the comparative example were at substantially equivalent abrasion loss levels.

Then, adhesion of the carbon films with respect to the substrates was evaluated by an indentation test with a Vickers indenter under a constant load of 1 kg. 50 samples were prepared for each example, and the numbers of the samples suffering separation of the carbon films were counted.

Table 5 shows the results.

TABLE 5

|  | Example 14 | Comparative Example 4 |
|---|---|---|
| Number of Samples Suffering Separation | 0 | 0 |

It is clearly understood from Table 5 that the carbon films according to Example 14 and comparative example were at equivalent adhesion levels.

Figure 27:
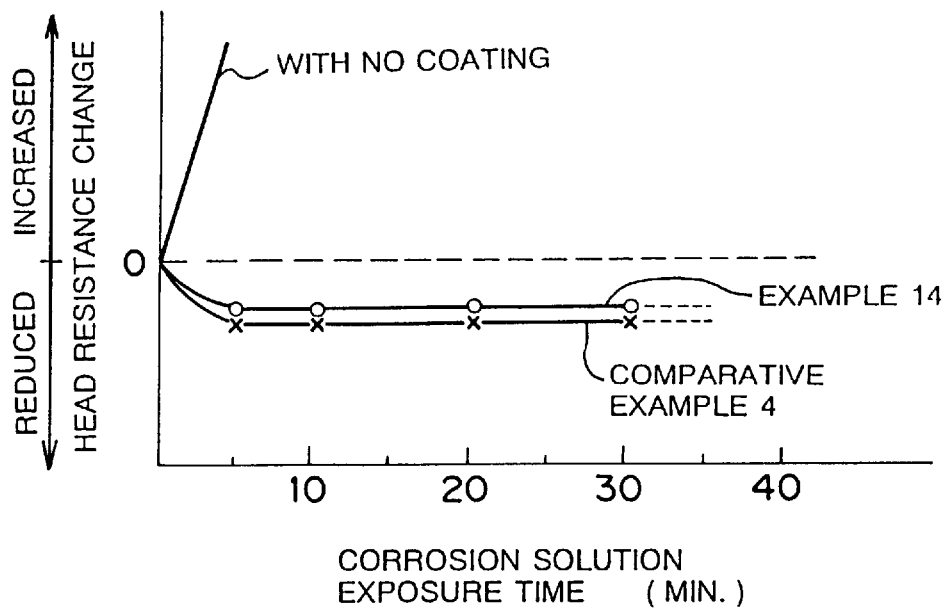
FIG. 27 illustrates corrosion resistance of thin-film magnetic heads according to an Example of the inventive method and a comparative example.

Then, the thin-film magnetic heads according to Example 14 and comparative example 4 were subjected to a corrosion test, which was made by exposing the thin-film magnetic heads to a corrosion solution for a prescribed time and determining head resistance values for measuring relations between the head resistance values and the exposure times. The corrosion solution was prepared from aqueous iron chloride. FIG. 27 shows the results, with that of a thin-film magnetic head provided with no carbon film shown as "with no coating".

As clearly understood from FIG. 27, the head resistance value was abruptly increased in the thin-film magnetic head provided with no carbon film. It is also understood that the thin-film magnetic heads according to Example 14 and comparative example 4 which were provided with the carbon films in accordance with the present invention and the conventional method respectively exhibited substantially equivalent corrosion resistance.

As hereinabove described, the thin-film magnetic head according to Example 14 exhibited characteristics such as abrasion resistance, corrosion resistance and adhesion which were equivalent to those of the thin-film magnetic head according to comparative example 4. Thus, it is possible to form a carbon film exhibiting characteristics such as abrasion resistance which are similar to those of a conventional carbon film under conditions subjected to smaller influences exerted by a magnetic field and a high temperature.

While the above Examples have been described with reference to thin-film magnetic heads serving as substrates, the substrate employed in the present invention is not restricted to a thin-film magnetic head, but the present invention is also applicable to formation of a carbon film on a substrate which is preferably prevented from influences exerted by a magnetic field and a high temperature.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thin-film magnetic head for at least one of writing information to or reading information from a magnetic recording medium by being moved relative to the magnetic recording medium with a slider surface of said magnetic head facing the magnetic recording medium, said thin-film magnetic head comprising:

a head member having said slider surface;

an intermediate layer arranged on at least a partial region of said slider surface of said head member; and a carbon film having a thickness of not more than 200 Å covering said slider surface of said head member with said intermediate layer between said slider surface and said carbon film;

wherein said intermediate layer is a discontinuous layer including discontinuous layer portions dispersed across said slider surface in the form of islands; and wherein said carbon film is a continuous layer that covers said discontinuous layer portions of said intermediate layer.

2. The thin-film magnetic head in accordance with claim 1, wherein said intermediate layer is made of a material having a thermal expansion coefficient in a range of 1.0 to $10 \times 10^{-6}/°$ C.

3. The thin-film magnetic head in accordance with claim 1, wherein said intermediate layer is made of $SiO_2$.

4. The thin-film magnetic head in accordance with claim 1, wherein said intermediate layer is made of a material selected from the group consisting of carbides of at least one of Zr, Ru and Ge with a compositional gradient in which a carbon content increases from a side of said intermediate layer adjacent said slider surface toward a side of said intermediate layer adjacent said carbon film.

5. A thin-film magnetic head for at least one of writing information to or reading information from a magnetic recording medium by being moved relative to the magnetic recording medium with a slider surface of said magnetic head facing the magnetic recording medium, said magnetic head comprising:

a head member having said slider surface and a first side surface that is adjacent an edge of said slider surface and that is substantially perpendicular to said slider surface, wherein said first side surface comes close to the magnetic recording medium upon stopping of the relative movement thereof;

a carbon film covering said slider surface and at least a portion of said first side surface; and an intermediate layer arranged in at least a partial region between said carbon film and said slider surface of said head member, wherein said intermediate layer is a discontinuous layer including discontinuous layer portions dispersed on said slider surface of said head member in the form of islands, and wherein said carbon film is a continuous layer that covers said discontinuous layer portions of said intermediate layer.

6. The thin-film magnetic head in accordance with claim 5, wherein said intermediate layer is made of a material having a thermal expansion coefficient in a range of 1.0 to $10 \times 10^{-6}/°$ C.

7. The thin-film magnetic head in accordance with claim 5, wherein said intermediate layer is made of at least one material selected from the group consisting of Si, Zr, Ti, Ru and Ge, and oxides, nitrides and carbides thereof.

8. The thin-film magnetic head in accordance with claim 5, wherein said intermediate layer is arranged on said slider surface and on said portion of said first side surface.

9. The thin-film magnetic head in accordance with claim 5, wherein said intermediate layer is arranged only on said slider surface and not on said first side surface.

10. The thin-film magnetic head in accordance with claim 5, wherein said intermediate layer is made of a carbide and has a compositional gradient in which a carbon content increases from a side of said intermediate layer adjacent said slider surface toward a side of said intermediate layer adjacent said carbon film.

\* \* \* \* \*

UNITED STATES PATENT AND TRADEMARK OFFICE
CERTIFICATE OF CORRECTION

PATENT NO. : 5,864,452
DATED : January 26, 1999
INVENTOR(S) : Hirano, et. al.

It is certified that error appears in the above-identified patent and that said Letters Patent is hereby corrected as shown below:

Cover page, col. 1, [75], should read as follows:
--Inventors: Hitoshi Hirano, Nishinomiya;
Keiichi Kuramoto, Kadoma; Yoichi Domoto,
Ikoma; Seiichi Kiyama, Takatsuki; all of
Japan--.

Cover Sheet, col. 2, under [56] OTHER PUBLICATIONS:
line 2, after "Heads"," replace "Burus et al," by --Burns et al.,--;

Col. 13, line 31, after "at", replace "$5.7 \times 10^{x4}$" by --$5.7 \times 10^{-4}$--.

Col. 14, line 33, after "times", replace "was" by --were--.

Col. 15, line 45, after "structure" insert --in--.

Signed and Sealed this

Twenty-fourth Day of August, 1999

Attest:

Q. TODD DICKINSON

*Attesting Officer*  *Acting Commissioner of Patents and Trademarks*